US009025828B2

(12) United States Patent
Karel et al.

(10) Patent No.: US 9,025,828 B2
(45) Date of Patent: May 5, 2015

(54) METHODS AND SYSTEMS FOR ENHANCING READ ACCURACY IN AN AUTOMATED LICENSE PLATE READER SYSTEM

(75) Inventors: Gerald L. Karel, Maplewood, MN (US); Thomas J. Dahlin, St. Louis Park, MN (US); Patrick R. Fleming, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 85 days.

(21) Appl. No.: 13/885,334

(22) PCT Filed: Dec. 2, 2010

(86) PCT No.: PCT/US2010/058643
§ 371 (c)(1),
(2), (4) Date: May 14, 2013

(87) PCT Pub. No.: WO2012/074526
PCT Pub. Date: Jun. 7, 2012

(65) Prior Publication Data
US 2013/0272580 A1 Oct. 17, 2013

(51) Int. Cl.
*G06K 9/32* (2006.01)
*G08G 1/017* (2006.01)
*G06K 19/06* (2006.01)

(52) U.S. Cl.
CPC ............ *G06K 9/3258* (2013.01); *G08G 1/0175* (2013.01); *G06K 2209/15* (2013.01); *G06K 19/06028* (2013.01); *G06K 19/06037* (2013.01); *G06K 19/06046* (2013.01)

(58) Field of Classification Search
USPC ................. 382/100, 103, 105; 270/52.02
See application file for complete search history.

(56) References Cited

U.S. PATENT DOCUMENTS

| 4,368,979 A * | 1/1983 | Ruell ................ 356/71 |
| 4,908,500 A * | 3/1990 | Baumberger ............. 235/384 |
| 5,315,664 A * | 5/1994 | Kumagai ............... 382/105 |
| 5,436,437 A * | 7/1995 | Ho ................... 235/384 |
| 5,788,796 A * | 8/1998 | Look et al. ............... 156/277 |
| 6,739,511 B2 * | 5/2004 | Tsikos et al. ............. 235/462.01 |
| 6,786,560 B2 | 9/2004 | Heath |
| 6,832,728 B2 * | 12/2004 | Kennedy ................ 235/468 |
| 7,505,180 B2 | 3/2009 | DeYoung |
| 8,865,293 B2 | 10/2014 | Smithson |
| 2003/0042303 A1 * | 3/2003 | Tsikos et al. ............. 235/384 |
| 2004/0091658 A1 | 5/2004 | Ginkel et al. |
| 2006/0283952 A1 | 12/2006 | Wang |
| 2007/0126226 A1 | 6/2007 | Kolodzie et al. |
| 2010/0151213 A1 * | 6/2010 | Smithson et al. ........... 428/195.1 |
| 2011/0042462 A1 * | 2/2011 | Smith .................. 235/462.11 |

FOREIGN PATENT DOCUMENTS

| EP | 0416742 | 3/1991 |
| JP | 2004-341146 | 12/2004 |
| WO | WO 2008/007076 | 1/2008 |

OTHER PUBLICATIONS

PCT International Search Report from PCT/US2010/058643 mailed on Feb. 8, 2011, 6 pages.

* cited by examiner

*Primary Examiner* — Anand Bhatnagar
(74) *Attorney, Agent, or Firm* — Emily M. Van Vliet; Sandra K. Nowak

(57) ABSTRACT

One embodiment of the apparatuses, methods, and systems of the present disclosure is a license plate, sticker, or ALPR system having enhanced or increased accuracy. At least one of the license plate, sticker, or ALPR system includes useful information that is transmitted over a first channel and checking information that is transmitted over a second channel. The second channel is devoted solely to transmitting the checking information (e.g., the second channel does not transmit useful information). In other words, the license plates, stickers, and ALPR systems of the present disclosure include at least one channel that is devoted solely to transmitting checking information.

13 Claims, No Drawings

METHODS AND SYSTEMS FOR ENHANCING READ ACCURACY IN AN AUTOMATED LICENSE PLATE READER SYSTEM

TECHNICAL FIELD

The present disclosure generally relates to methods, apparatuses, and systems for enhancing read accuracy in an automated license plate reader system.

BACKGROUND

Automatic Vehicle Recognition (AVR) is a term applied to the detection and recognition of a vehicle by an electronic system. AVR systems, including, for example, electronic toll systems, red light running systems, speed enforcement systems, and access control systems, are becoming more prevalent. Ideal AVR systems are able to read all vehicles with 100% accuracy. The two main types of AVR systems in use today are (1) systems using RFID technology to read an RFID tag attached to a vehicle and (2) systems using a machine or device to read a machine readable code attached to a vehicle.

One advantage of RFID systems is their high accuracy, which is achieved by virtue of error detection and correction information contained on the RFID tag. Using well known mathematical techniques (cyclic redundancy check, or CRC, for example), the probability that a read is accurate (or the inverse) can be determined. However, RFID systems have some disadvantages, including that not all vehicles include RFID tags. Also, existing "passive" RFID systems (unpowered RFID tags plus readers) cannot pinpoint the exact location of a tagged object. Rather, they simply report the presence or absence of a tag in their field of sensitivity. Moreover, many passive RFID systems only operate at short range, function poorly in the presence of metal, and are blocked by interference when many tagged objects are present. Some of these problems can be overcome by using active RFID technology or similar methods. However, these techniques require expensive, power-consuming electronics and batteries, and they still may not determine position accurately when attached to dense or metallic objects.

Machine vision systems (often called Automated License Plate Readers or ALPR systems) use a machine or device to read a machine readable code attached to a vehicle. In many embodiments, the machine readable code is attached to, printed on, or adjacent to a license plate. An optimal ALPR system must be able to accurately read all license plates that may pass through the system. One advantage of ALPR systems is that they are can be used almost universally, since almost all areas of the world require that vehicles have license plates with visually identifiable information thereon. However, the task of recognizing visual tags can be complicated. For example, the read accuracy from an ALPR system is largely dependent on the quality of the captured image as assessed by the reader. Accurate reading of a vehicle's license plate is becoming increasingly difficult for a variety of reasons one of which is the wide variety of license plates now on the roads.

Many licensing authorities offer "specialty" license plates. Such plates allow the driver to select an attractive or meaningful design that will be printed on their license plate. The production of such "specialty" license plates results in each state offering numerous different license plate designs to its constituents. The state of Oregon, for example, offers seven different license plate design options to standard vehicle drivers: tree, salmon, Crater Lake, cultural trust, amateur radio operator (ham), antique vehicle, and special interest. Also, the state offers six types of non-profit plates to standard vehicle drivers: Lions Club, Oregon Masonic Family, Oregon Professional Firefighters, Oregon State Elks, Share the Road, and Support Our Troops plates. Additionally, the state offers six types of high education plates to drivers of standard vehicles: Eastern Oregon University, Oregon State University, Portland State University, University of Oregon, University of Portland, and Willamette University. Further, the state offers ten veteran and service-related plates to drivers of standard vehicles: Congressional Medal of Honor; Disabled Veteran; Ex-POW; First Marine Division; Gold Star Family; National Guard; Non-Commission Officers Association; Purple Heart; Veterans Recognition; and Vietnam Veterans. This results in a total of 33 different personalized plate options for standard vehicles in a single state. If each of the 50 states and each of the 10 Canadian provinces offered approximately the same number of options for standard vehicles, almost 2000 different design options for license plates would be available. This does not even take into account the license plate options for mopeds, motorcycles, campers, trailers, trucks, commercial vehicles, government vehicles, dealer vehicles, and motor homes. Also, each license plate type may use a different font, and font misinterpretation is a common error in ALPR systems.

Another reason why accurate license plate reading is challenging is that license plates naturally get dirty. ALPR systems often rely on optical identification of the alphanumerics on a license plate in order to accurately read the license plate. When these alphanumerics are dirty, they become obscured and their visibility and clarity is significantly compromised, often resulting in inaccurate license plate reads. Additionally, existing ALPR systems have difficulty distinguishing the machine readable code from complex backgrounds and in variable lighting conditions.

One exemplary ALPR system includes a bar code containing "an identification code which will provide information about the vehicle," as is described in PCT Publication No. 2008/007076 to Retainagroup Ltd. Some publications (e.g., European Patent Publication No. 0416742 and U.S. Pat. No. 6,832,728) discuss including one or more of owner information, serial numbers, vehicle type, vehicle weight, plate number, state, plate type, and county on a machine readable portion of a license plate.

SUMMARY

The present inventors recognized the need for methods, apparatuses, and systems for identifying objects. The present inventors also recognized the need for methods, apparatuses, and systems for increasing the read accuracy of an ALPR system.

The present inventors recognized that license plate read accuracy could be enhanced by inclusion of checking information accessible through a second channel that is devoted solely to transmission of the checking information. One embodiment of the present disclosure is a license plate, comprising: a license plate blank to which is attached a reflective sheeting; and a machine readable element including useful information accessible through a first channel and checking information accessible through a second channel, wherein the second channel is devoted solely to the transmission of checking information (e.g., does not transmit useful information).

One embodiment of the present disclosure is a sticker capable of attachment to at least one of a license plate, a vehicle, and a license plate frame, the sticker comprising: a machine readable element including useful information accessible through a first channel; and checking information accessible through a second channel, wherein the second channel is devoted solely to the transmission of checking information.

One embodiment of the present disclosure is an ALPR system, comprising: the license plate described above; an apparatus capable of reading the useful information through a first channel; a machine capable of reading the machine readable information through a second channel that differs from the first channel; and a processing unit that processes the checking information and uses the checking information to verify the accuracy of the reading of the useful information.

One embodiment of the present disclosure is an ALPR system, comprising: a license plate including useful information; a sticker as described above; an apparatus capable of reading the useful information through a first channel; a machine capable of reading the machine readable information through a second channel that differs from the first channel; and a processing unit that processes the checking information and uses the checking information to verify the accuracy of the reading of the useful information.

One embodiment of the present disclosure is a method of enhancing the accuracy of license plate readings, comprising: providing a license plate including useful information; providing checking information; reading the useful information through a first channel; and reading the checking information through a second channel that differs from the first channel and using the checking information to verify the accuracy of the reading of the useful information.

In some embodiments, the checking information is printed on, adhered to, or positioned adjacent to at least a portion of the license plate. In some embodiments, the useful information includes one or more of alphanumeric characters and designs and the checking information includes a bar code. One exemplary preferred type of barcode is a 2D barcode.

DETAILED DESCRIPTION

The systems, methods, and apparatuses of the present disclosure generally describe vehicles (e.g., trains, planes, automobiles, or boats) including an identifier (e.g., a license plate, frame, or sticker) including useful information accessible through a first channel and checking information accessible through a second channel that is devoted solely to transmitting checking information (i.e., that does not transmit any useful information). The following will be discussed with respect to license plates and stickers, but the present disclosure is meant to include objects other than license plates and stickers.

In describing various embodiments of the present disclosure, specific terminology will be used for the sake of clarity. The scope of the disclosure, however, is not intended to be limited to the specific terms so selected, and it is to be understood that each term so selected includes all technical equivalents that operate similarly.

Glossary of Selected Terms

"Channel" means a path along which information passes or is transmitted. Channels can be, for example, optical, radio frequency, acoustic, sonic, or tactile (e.g., Braille). Some exemplary channels (e.g., acoustic, optical, and radio) are separated by wavelength (e.g., red or green light), by time (e.g., time division multiplexing used in cell phones), by position (e.g., the front and back of a sign), or by medium (e.g., light via the atmosphere versus light via an optical fiber). Some exemplary channels are separated by format. For example, English and French can be used as two separate acoustic, optical, or visual channels because they require different algorithms to interpret.

"Checking information" means information that has no use other than to verify the accuracy of the transmission of the useful information. Checking information does not duplicate or replicate useful information. There are at least two types of checking information that can be used with the apparatuses and systems of the present disclosure: (1) computed (an algorithm allows one to compute the checking information from the transmitted useful data and the computed checking information is compared with the stored checking data to verify accuracy of the transmitted useful information); and (2) lookup tables.

"License plate number" shall refer to the alphanumeric identifier embossed or printed on a license plate.

"Machine readable element" shall mean a distinct part that is capable of being read by a machine. In other words, a machine readable element is any element capable of being read by a machine.

"Reading," "reads," or "read accuracy" means the machine interpretation of the useful or checking information contained on an object, such as, for example, a license plate, sticker, or frame.

"Useful information" means any piece of information in set of information or data used to uniquely identify a specific vehicle. Exemplary pieces of useful information include, for example, a license plate number, a state identifier, and a plate type. Notably, none of these pieces of information alone uniquely identify a license plate but a number of pieces of useful information can uniquely identify a specific license plate. The useful information, which may be, for example, in alphanumeric or graphic form can be formed on a license plate, can be formed on license plate sheeting, can be adhered to a license plate, can be formed on a cover or frame positioned adjacent to the license plate, can be adhered to a cover or frame adjacent to the license plate, or can be otherwise affixed to the object.

Currently available license plates and ALPR systems include license plates having useful information accessible through at least a first channel. Some examples of this include an OCR camera reading a license plate number and state identifier to identify a license plate and/or vehicle. The license plate number and state identifier are each pieces of useful information. The OCR camera (and its associated processing systems) forms the channel.

In one prior art example, useful information is in the form of letters numbers and images printed on the license plate and visible to the human eye in normal daylight. In this example, the useful information is read using a camera having pattern recognition software to locate the license plate and optical character recognition software to identify the license plate number. The camera can be a color camera detecting all three colors, but the three color channels are typically collapsed into a single channel, for example by adding the values of all color channels together, in order to be processed by the optical character recognition software. Alternately, the camera can detect images at infrared wavelengths, and this infrared image can be used by the pattern detection and optical character recognition software to identify the license plate. The useful information can also be in the form of a graphic printed on the license plate, for instance, the loon image on the Minnesota loon license plate identifies that license plate as a Minnesota passenger loon license plate. This graphic together with the license plate number uniquely identifies the vehicle. An image of the Minnesota passenger loon license plate can be captured by, for example, a black and white camera sensitive to the visible wavelengths. The loon graphic can be identified by pattern recognition software (a first channel) and the plate number by optical character recognition software (a second channel). These two pieces of useful information each of which are transmitted over its own channel can then be used to uniquely identify the vehicle.

In some instances, for at least some of the reasons described in the background section, one or more of the various pieces of useful information on a license plate may not be accurately read, transmitted, and/or processed. Prior art systems have addressed this problem by duplicating the useful information and transmitting it over either the same channel or over a different channel. For example, a bar code that is transmitted over the second channel could contain at least part of the same license plate number transmitted over the first channel. The two sets of useful information are compared and, if they match, the confidence of the read is increased. Such embodiments can show significant increases in the probability that the license plate information is accurately read because the checking information provides a self-check of the useful information on or adjacent to the license plate.

The inventors of the present application recognized that duplication and/or replication of the useful information can be difficult to accomplish because of the large number of machine readable bits required to replicate and/or duplicate all of the useful information (e.g., license plate state, license plate type, license plate number, license plate graphics, license plate issuance year and/or month, etc.). Because the available space on a license plate for duplication of useful information is limited and because there is a desire not to overcrowd the license plate so that it remains both legible and aesthetically pleasing, duplication or replication of information can be challenging. The inventors of the present disclosure invented apparatuses, methods, and systems to increase the accuracy of license plate reading without duplicating or replicating useful information.

One embodiment of the apparatuses, methods, and systems of the present disclosure is a license plate, sticker, or ALPR system having enhanced or increased accuracy. At least one of the license plate, sticker, or ALPR system includes useful information that is transmitted over a first channel and checking information that is transmitted over a second channel. The second channel is devoted solely to transmitting the checking information (e.g., the second channel does not transmit useful information). In other words, the license plates, stickers, and ALPR systems of the present disclosure include at least one channel that is devoted solely to transmitting checking information. However, the license plates, stickers, or ALPR systems can also include one or more additional channels along which useful or checking information (or a combination thereof) is transmitted.

In some embodiments, the first and second channels are the same channel type, and in some embodiments, the first and second channels are of different channel types. Some embodiments include numerous channels along which useful information is transmitted in addition to the channel devoted solely to transmission of checking information. Some embodiments include numerous types of checking information, some of which is transmitted along one or more of the channels along which useful information is transmitted and some of which is transmitted along the channel that is devoted solely to transmitting checking information.

Checking information can be, for example, information that is encoded in or computed from a form that can be imaged, read, and/or scanned by a machine or computer and interpreted by its hardware and software. Machine readable information is included in a machine readable element. Exemplary types of machine readable information include, for example, bar codes, 2D bar codes, geometric symbols as described in European Publication No. 0416742, and the like. Alternately the checking information can be encoded in an alphanumeric character that can only be read on a second optical channel. The checking information can be, for example, visible or invisible to the human eye. The checking information can be made invisible to the human eye by, for example, wavelength shifting, use of specific lighting conditions, IR absorbing dyes, multi-layer optical films, and the like. The checking information can be formed directly on the vehicle, can be formed on the license plate, can be adhered to the license plate, can be formed on a cover or frame adjacent to the license plate, can be adhered to a cover or frame adjacent to the license plate, or can be otherwise affixed to the object.

In one embodiment, useful information (e.g., license plate alphanumerics) is transmitted over a first channel (e.g., an optical channel in which the license plate is imaged using a camera and the image is read with OCR software). The checking information is encoded in a 2D barcode and is transmitted over a second channel (e.g., an optical channel in which the checking information is read with a camera). The transmitted useful and checking information is in the form of numerical bits. Upon receipt of these numerical bits, one or more algorithms are used to assemble the useful and checking information into their intended form. The checking information is additionally computed from the transmitted useful information. A comparison of the transmitted checking information and the checking information computed from the transmitted useful information, each of which was transmitted over a separate channel, enhances the accuracy of the license plate read. In this example, the enhanced accuracy (confidence) comes in the comparison of checking data from two difference sources 1) transmitted directly and 2) computed from the transmitted useful information.

Another embodiment includes a retroreflective license plate with an alphanumeric identifier printed and/or embossed thereon. The alphanumeric identifier is visible to the human eye. The license plate may also include, for example, graphics, a state symbol, or another identifier. There is a small (e.g., less than 4 square inches, or more preferably less than 2 square inches) retroreflective sticker on the license plate. In some embodiments, the sticker is a renewal sticker. In such embodiments, the renewal sticker may have the renewal information plainly visible to the human eye in daylight. This renewal information may be, for example, a month and/or year abbreviation. In some embodiments, the color of the sticker is coordinated with the renewal cycle. The sticker includes a code that contains the checking information. In some embodiments, this code is not plainly visible to the human eye in daylight, but can be imaged (e.g., detected) under, for example, retroreflected light or light of a given wavelength (e.g., infrared light). In some embodiments, this code is a barcode, preferably a 2D barcode. A preferred ALPR system includes this license plate and a camera that can image both the identifier and the checking information in the same image. Separate algorithms are used to extract the identifier and checking information from the image.

Another way to verify information on a license plate using information transmitted is to connect the useful information transmitted over the first channel and the checking information transmitted over the second channel via a lookup table. For example, the serial number contained in an RFID tag affixed to the license plate could be associated with the number on that plate in a lookup table, verifying the reading of the plate number.

The checking information can be placed on, for example, a bumper sticker, a license plate, a license plate frame, or the like. Alternatively, the checking or useful information can be included in a sticker capable of being adhered to a license plate or other portion of a vehicle. One advantage of putting the useful or checking information on a sticker is that existing license plates can be renewed and updated by reissuing only the stickers, thereby avoiding the expense and hassle of reissuing all of the license plates. Additionally, in at least some implementations, the checking information would make the stickers plate-specific such that the sticker would not work if it was, for example, stolen in the mail and placed on another plate. Another advantage is that the sticker can be sized to ensure that the license plate is aesthetically pleasing and to avoid cluttering the already full license plate. This is especially useful for license plates in the United States where there is little room for additional stickers, because most of the license plate is used for large alphanumeric characters that form the license plate number, renewal stickers, and/or plate holders/covers/frames. Additionally, the individual pixels in the bar code on the sticker must be of a size that permits adequate resolution by the machine or device (e.g., camera) that reads the bar code. Typical commercially available ALPR systems use cameras that have sensors with approximately 2000 pixels per line, covering approximately 15 feet of lane width, translating to approximately 133 pixels per foot (11 pixels per inch), or a minimum detectable feature of about 0.2 inches (about 2 camera pixels).

Typical registration stickers in the United States measure approximately 1 to 1.5 square inches, meaning that they can include approximately 35 bits, of which approximately 16-24 bits of data is non-framing or timing data (assuming that approximately twelve bits of data are used for framing and timing, 23 bits of data can be used for the error detection and/or correction). For a 1 inch sticker including only the framing bits, timing bits, and error detection/correction bits, the confidence level for license plate read accuracy can be improved to better than 99.999% when both the plate number and the bar code are correctly read. The current annual renewal stickers are about 1.5 square inches. For a 1.5 inch sticker including only the framing bits, timing bits, and error correction and/or detection bits, the confidence level for license plate read accuracy can be improved even more when both the plate number and the bar code are correctly read.

The license plates and/or stickers described above can be used in any ALPR system. One exemplary implementation of such an ALPR system includes a license plate of the type described above; an apparatus for reading the useful information through a first channel; a machine capable of reading the checking information through a second channel; and a processing unit that processes the useful information and uses the checking information to verify the accuracy of the reading of the useful information. The machine capable of reading the checking information can be, for example, a camera. One exemplary commercially available camera commonly used in ALPR systems is Model 383, Spike™ sold by PIPS Technology, a division of Federal Signal Company. The processing unit can be, for example, a computer or the software in the camera. Those of skill in the art will recognize how to program the software in operation in the processing unit to detect, correlate, and process the checking information. The data structures and code described herein are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

The recitation of all numerical ranges by endpoint is meant to include all numbers subsumed within the range (i.e., the range 1 to 10 includes, for example, 1, 1.5, 3.33, and 10).

Those having skill in the art will appreciate that may changes may be made to the details of the above-described embodiments and implementations without departing from the underlying principles thereof. Further, various modifications and alterations of the described embodiments will become apparent to those skilled in the art without departing from the spirit and scope of the disclosure. Although multiple embodiments have been illustrated and described, it will be appreciated by those of ordinary skill in the related arts that insubstantial changes calculated to achieve the same result may be substituted for the specific embodiments and steps disclosed above. This application is intended to cover any such adaptations or variations. The scope of the present application should, therefore, be determined only by the following claims.

What is claimed is:

1. A license plate, comprising:
   a license plate blank to which is attached a reflective sheeting; and
   a machine readable element including useful information accessible through a first channel and checking information only to verify the accuracy of the transmission of the useful information transmitted via the first channel without duplicating or replicating useful information accessible through a second channel, wherein the second channel is devoted solely to the transmission of checking information, and wherein the first channel and the second channel are separated by at least one of: wavelength, time, position, or medium.

2. The license plate of claim 1, wherein the checking information is printed on, adhered to, or adjacent to at least a portion of the license plate.

3. The license plate of claim 1, wherein the machine readable element includes a barcode.

4. The license plate of claim 1, wherein the checking information is in the form of a barcode.

5. The license plate of claim 3, wherein the barcode is a 2D barcode.

6. A sticker capable of attachment to at least one of a license plate, a vehicle, and a license plate frame, the sticker comprising:
   a machine readable element including useful information accessible through a first channel; and
   checking information only to verify the accuracy of the transmission of the useful information transmitted via the first channel without duplicating or replicating useful information accessible through a second channel, wherein the second channel is devoted solely to the transmission of checking information, and wherein the first channel and the second channel are separated by at least one of: wavelength, time, position, or medium.

7. The sticker of claim 6, wherein the checking information is encoded in a barcode.

8. The sticker of claim 7, wherein the barcode is a 2D barcode.

9. The sticker of claim 6, for use in an ALPR system.

10. An ALPR system, comprising:
    the license plate according to any of claims 1-5;
    an apparatus capable of reading the useful information through a first channel;
    a machine capable of reading the machine readable information through a second channel that differs from the first channel; and a processing unit that processes the useful information and uses the checking information to verify the accuracy of the reading of the useful information.

11. An ALPR system, comprising:
a license plate including useful information;
a sticker according to any of claims 6-9;
an apparatus capable of reading the useful information through a first channel;
a machine capable of reading the machine readable information through a second channel that differs from the first channel; and
a processing unit that processes the useful information and uses the checking information to verify the accuracy of the reading of the useful information.

12. A method of enhancing the accuracy of license plate readings, comprising:
providing a license plate including useful information;
providing checking information only to verify the accuracy of the transmission of the useful information transmitted via the first channel without duplicating or replicating useful information;
reading the useful information through a first channel; and
reading the checking information through a second channel that differs from the first channel and using the checking information to verify the accuracy of the reading of the useful information, wherein the first channel and the second channel are separated by at least one of: wavelength, time, position, or medium.

13. The license plate of claim 4, wherein the barcode is a 2D barcode.

* * * * *